United States Patent
Rangarajan et al.

(10) Patent No.: US 10,831,667 B2
(45) Date of Patent: Nov. 10, 2020

(54) ASYMMETRIC MEMORY TAG ACCESS AND DESIGN

(71) Applicant: QUALCOMM Incorporated, San Diego, CA (US)

(72) Inventors: Bharat Kumar Rangarajan, Bangalore (IN); Chulmin Jung, San Diego, CA (US); Rakesh Misra, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/173,221

(22) Filed: Oct. 29, 2018

(65) Prior Publication Data

US 2020/0133862 A1 Apr. 30, 2020

(51) Int. Cl.
*G06F 12/0846* (2016.01)
*G06F 12/0808* (2016.01)
*G06F 12/0891* (2016.01)
*G06F 12/0895* (2016.01)

(52) U.S. Cl.
CPC ...... *G06F 12/0846* (2013.01); *G06F 12/0808* (2013.01); *G06F 12/0891* (2013.01); *G06F 12/0895* (2013.01)

(58) Field of Classification Search
CPC ............. G06F 12/0849; G06F 12/0895; G06F 12/0808; G06F 12/0897
See application file for complete search history.

(56) References Cited

U.S. PATENT DOCUMENTS

2011/0082983 A1* 4/2011 Koktan ............... G06F 12/0804
711/135

* cited by examiner

*Primary Examiner* — Ramon A. Mercado
(74) *Attorney, Agent, or Firm* — Patterson & Sheridan, L.L.P.

(57) ABSTRACT

Various aspects are described herein. In some aspects, the disclosure provides techniques for accessing tag information in a memory line. The techniques include determining an operation to perform on at least one memory line of a memory. The techniques further include performing the operation by accessing only a portion of the at least one memory line, wherein the only the portion of the at least one memory line comprises one or more flag bits that are independently accessible from remaining bits of the at least one memory line.

13 Claims, 4 Drawing Sheets

ASYMMETRIC MEMORY TAG ACCESS AND DESIGN

TECHNICAL FIELD

The teachings of the present disclosure relate generally to memory in computing systems, and in certain aspects, to reducing the overhead in accessing memory tag information.

INTRODUCTION

Computing devices, such as a computing device implementing a system-on-chip (SoC) architecture, may include multiple subsystems. For example, a SoC generally includes one or more central processing unit (CPU) subsystems (CPUSS), graphics processing unit (GPU) subsystems (GPUSS), digital signal processor (DSP) subsystems (DSPSS), etc. Each subsystem may include multiple computing cores and volatile memory (e.g., registers, cache, such as L1, L2, L3 cache, main memory, etc.) associated with the multiple computing cores. For example, a CPUSS may include multiple CPU cores embedded in an integrated circuit or chip and coupled to a local bus. The CPU cores may further be arranged into one or more computing clusters, each cluster including one or more cores.

In certain cases, cores may be configured to individually run in different operating modes including a low power mode (e.g., a power collapse mode, retention mode, etc.) or an active mode (e.g., a turbo mode (e.g., turbo L2 mode), a nominal mode, etc.). In certain aspects, cores may operate at different frequencies to further improve performance. For example, a high performance core (or gold CPU) may run at a higher frequency than a low performance core (or silver CPU). The gold CPU can be powered down to a low power mode during low performance tasks that can be executed by the silver CPU, and the gold CPU can be activated to an active mode when tasks exceed the performance capabilities or other specified parameters of the silver CPU. In certain aspects, a single application may use both a gold CPU and silver CPU individually or concurrently and may also frequently switch between cores for performance and/or power conservation reasons.

To meet the required frequency targets of these modern high performance cores, high performing memory is used, which can result in higher dynamic and leakage power usage, which increases the overhead power usage of the computing system. To combat some power usage, in some computing devices, memory associated with a core may be powered down (e.g., put in retention mode, power collapse mode, etc.) based on the operating mode of the associated computing core. For example, if a memory is associated with a given computing core and that computing core is put in a low power mode, the memory may also be placed in the low power mode. If a memory is shared between computing cores, and one or more of the computing cores associated with the memory is put in a low power mode, a portion of the memory (e.g., proportional to the number of computing cores associated with the memory put into the low power mode) may correspondingly be put in the low power mode as well.

In one example, a core and its associated memory may be put in a power collapse mode when a task migration is performed. For example, task migration from the silver CPU to the gold CPU may be performed when the silver CPU does not support the requirements of an application running on the silver CPU (e.g., the application requires a frequency only supported by the gold CPU). Once the task is migrated, the silver CPU is power collapsed. In another example, a core is power collapsed once the application or task running on the core completes and no new tasks are scheduled to run on the core. Thus, it will be appreciated that power collapse may be selected for any cores in a variety of different circumstances.

In the power collapse mode, the core flushes the data in its caches (e.g., caches local to the core) to a higher level cache (e.g., L1 to L2 or L3) or main memory (e.g., accessible by other cores). This flushing process is handled (e.g., by the core or other hardware of the computing device) based in part on tag information in a tag cache associated with the cache. Each cache line in the tag cache includes tag information for a cache line of the cache and an address associated with the cache line of the cache. Tag information typically includes one or more flag bits, such as at the beginning of each cache line of the tag cache, that indicate whether a cache line in a cache that is associated with an address in the cache line of the tag cache is valid or invalid, clean or dirty, etc. For example, only cache lines in the cache indicated as valid and dirty may be flushed.

Then in certain aspects, when the core wakes up from power collapse (e.g., transition of the core and associated memory from power collapse to an active mode), the memory associated with the core (e.g., data cache, instruction cache, translation look-aside buffer (TLB) and branch target access (BTAC)) may be invalidated. The flush and invalidation processes cause high power usage at the computing device for reading and writing the memory. In particular, in order to perform the flush, all entries (e.g., cache lines) of the tag cache need to be read to determine the values of tag information, in order to identify which entries of the cache to flush.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method for accessing tag information in a memory line. The method includes determining an operation to perform on at least one memory line of a memory. The method further includes performing the operation by accessing only a portion of the at least one memory line, wherein the only the portion of the at least one memory line comprises one or more flag bits that are independently accessible from remaining bits of the at least one memory line.

In some aspects, the present disclosure provides a computing device comprising at least one computing core and a memory associated with the at least one computing core. The memory comprises at least one memory line. The at least one computing core is configured to determine an operation to perform on the at least one memory line. The at least one computing core is further configured to perform the operation by accessing only a portion of the at least one memory line, wherein the only the portion of the at least one memory line comprises one or more flag bits that are independently accessible from remaining bits of the at least one memory line.

In some aspects, the present disclosure provides a non-transitory computer readable medium that includes instructions that when executed by a computing core causes the computing core to perform a method of accessing tag information in a memory line. The method includes determining an operation to perform on at least one memory line of a memory. The method further includes performing the operation by accessing only a portion of the at least one memory line, wherein the only the portion of the at least one memory line comprises one or more flag bits that are independently accessible from remaining bits of the at least one memory line.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC) as an example of a computing device, the teachings are applicable in other areas. The teachings disclosed should not be construed to be limited to SoC designs or the illustrated embodiments. The illustrated embodiments are merely vehicles to describe and illustrate examples of the inventive teachings disclosed herein. For example, the techniques described herein may be applicable to various memory types.

Figure 1:
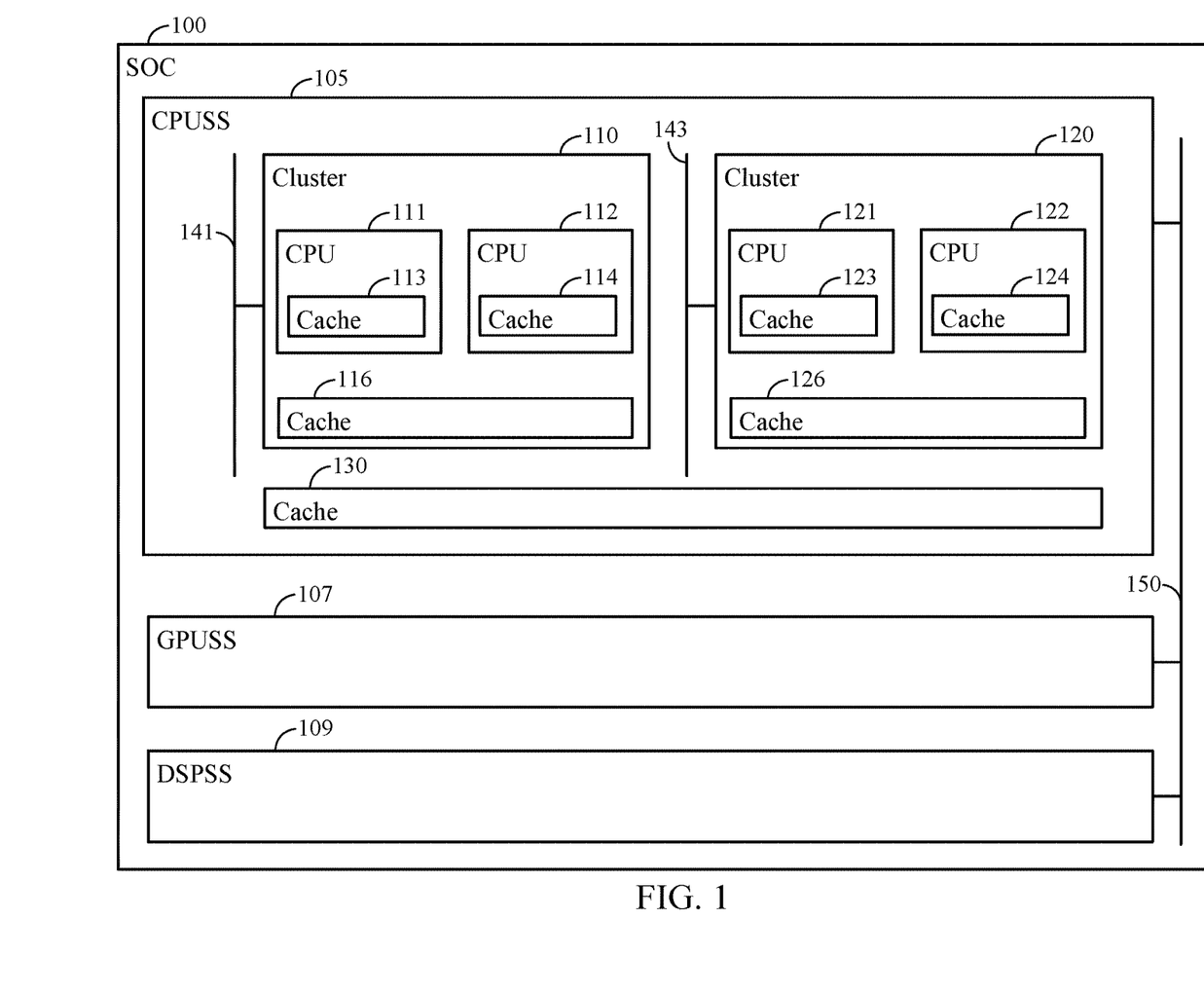
FIG. 1 is a simplified schematic diagram of a computing device, in accordance with certain aspects of the present disclosure.

FIG. 1 is a simplified schematic diagram of an exemplary computing device 100, in accordance with certain aspects of the present disclosure. In particular, computing device 100 is shown as a SoC and is referred to as SoC 100 herein. The SoC 100 may include additional components or fewer components than shown, and further may be interconnected to other chips by one or more chip-to-chip interfaces such as peripheral component interconnect express (PCIe), universal serial bus (USB), serial peripheral interface (SPI), network interface, etc.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.). A big.LITTLE design may refer to a computing architecture that includes low power, slower processor cores (e.g., LITTLE or silver) that provide battery-savings along with high power, and faster processor cores (e.g., big or gold) that provide better processing performance.

Further, the CPUSS 105 may include CPU resources, such as one or more volatile memories (e.g., caches) used by CPU cores for memory storage. For example, CPUSS 105 includes caches 113, 114, 116, 123, 124, 126, and 130. Caches 113, 114, 123, and 124 may be CPU core specific (e.g., L1 caches), meaning each of caches 113, 114, 123, and 124 is associated with and used by one of CPU cores 111, 112, 121, and 122. As shown, caches 113, 114, 123, and 124 are associated with CPU cores 111, 112, 121, and 122, respectively. Caches 116 and 126 may be CPU cluster specific (e.g., L2 caches), meaning each of caches 116 and 126 is associated with and used by each of the CPU cores of one of CPU clusters 110 and 120. As shown, caches 116 and 126 are associated with CPU clusters 110 and 120 respectively. Accordingly, cache 116 may be shared by CPU cores 111 and 112, and cache 126 may be shared by CPU cores 121 and 122. Cache 130 may be CPUSS specific (e.g., L3 cache), meaning cache 130 is shared by the CPU cores 111, 112, 121, and 122 of CPUSS 105. In certain aspects, CPUSS 105 includes additional or different CPU resources than those shown.

The SoC 100 further may include one or more additional CPUSS, one or more GPUSS such as GPUSS 107, and one or more DSPSS such as DSPSS 109. In certain aspects, each of GPUSS 107 and DSPSS 109 may have its own clusters of computing cores and volatile memory, similar to CPUSS 105. The internal components of the SoC 100 may be coupled together by a bus (not shown). It should be noted that though certain aspects are described with respect to a CPUSS and CPU cores as computing cores, techniques and aspects herein can also be used for other subsystem types (e.g., GPUSS, DSPSS, etc.) with other computing core types (e.g., GPU, DSP, etc.).

Each of clusters 110 and 120 of CPUSS 105 is supplied power by a voltage rail 141 and 143, respectively. Though not shown, each cluster of GPUSS 107 and DSPSS 109 may also be supplied power by a separate voltage rail. In particular, voltage rails 141 and 143 are configured to supply a voltage to clusters 110 and 120, respectively, such as to power the computing cores and peripheral components (not shown) of clusters 110 and 120. In certain aspects, each subsystem CPUSS 105, GPUSS 107, and DSPSS 109 (e.g., including each of their clusters) of SoC 100 is supplied power by a shared voltage rail 150. In particular, voltage rail 150 is configured to supply a voltage to each of CPUSS 105, GPUSS 107, and DSPSS 109, such as to power the caches of each of CPUSS 105, GPUSS 107, and DSPSS 109.

As discussed, each of clusters 110 and 120 may be configured to run in different active operating modes (e.g., nominal mode, turbo mode, turbo L2, etc.) where the computing cores of the cluster run at different frequencies and/or voltages. For example, the cluster 110 may run in a nominal mode where the CPU cores 111 and 112 run at a first frequency, and may run in a turbo mode where the CPU cores 111 and 112 run at a second frequency that is higher than the first frequency.

Individual computing cores of each cluster may also be capable of running in either an active mode or one or more low power modes, such as a power collapse mode, retention mode, etc. For example, each of CPU cores 111 and 112 may run in an active mode (e.g., turbo mode or nominal mode) corresponding to the active operating mode of cluster 110, a retention mode, or a power collapse mode. In the retention mode, a computing core may be clock gated and the volatile memory associated with the computing core may be retained so as to keep the current values stored in the volatile memory without changing the values. In the power collapse mode, the volatile memory may be flushed (e.g., to a non-volatile storage and/or a higher level cache (e.g., from L1 cache 113 to L2 cache 116 or L3 cache 130)). In retention mode, a computing core may be powered by a different voltage rail supplying a lower voltage, while in power collapse mode, the computing core is not powered. In certain aspects, SoC 100 includes switching circuitry comprising one or more switches (e.g., also referred to as power switches), such as transistors, that allow components (e.g., cores, peripheral components, memory instances, etc.) to run in the one or more power modes and in certain aspects the one or more switches are controlled in part by software.

Figure 2:
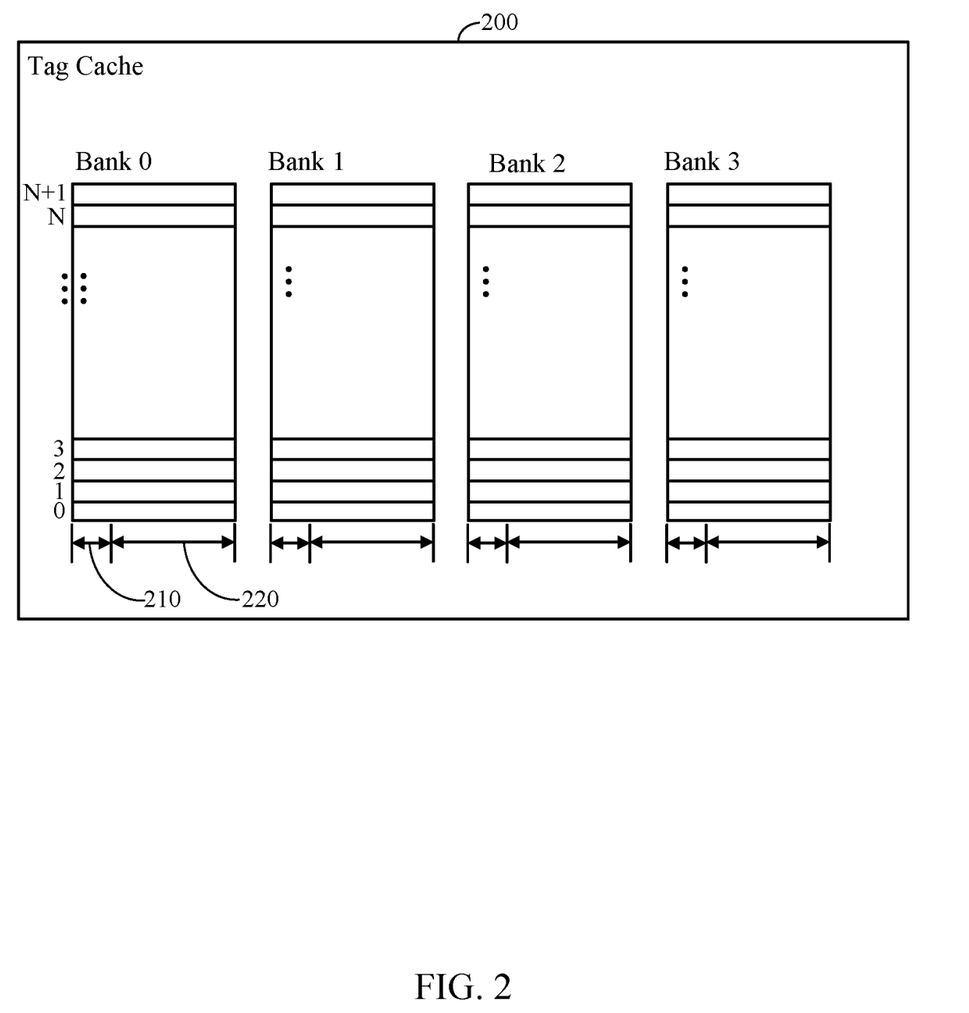
FIG. 2 is a simplified schematic diagram of a tag cache, in accordance with certain aspects of the present disclosure.

FIG. 2 is a simplified schematic diagram of a tag cache 200, according to certain aspects. Tag cache 200 may correspond to any of the caches shown in FIG. 1, or another cache of SoC 100. Tag cache 200 may serve as a tag cache for one or more data caches and/or instruction caches corresponding to the caches shown in FIG. 1 (e.g., caches 113, 114, 123, 124, 116, 126, 130, etc.). As shown, tag cache 200 is used as a tag cache (e.g., for a data cache) that includes 4 memory banks shown as Bank 0 through Bank 3, though the cache 200 may include a different number of memory banks. Each memory bank in cache 200 contains a plurality of memory lines (e.g., cache lines) shown as memory line 0 through line N+1. A typical memory bank may be 32 bits across (which may be referred to as a word), meaning each memory line includes 32 bits, and includes 128 memory lines, but other configurations are applicable to the present disclosure. Each memory bank includes tag information for each memory line. In the current example, the tag information includes two flag bits 210 per memory line (e.g., corresponding to the most significant bits of the memory line), valid and dirty, indicating whether the corresponding memory line is valid or invalid and dirty or not dirty, respectively. Each memory line also includes other data shown as address 220 (e.g., corresponding to the remaining bits of the memory line). The address 220 may be an address corresponding to a cache line of the data and/or instruction cache associated with the tag cache 200. Accordingly, the tag information in a memory line of tag cache 200 corresponds to the cache line of the data and/or instruction cache associated with the address in the memory line of tag cache 200, such as indicating whether the cache line of the data and/or instruction cache associated with the address in the memory line of tag cache 200 is valid and dirty. Therefore, in certain aspects, when it is discussed that the flag bits 210 indicate whether the corresponding memory line is valid or invalid and dirty or not dirty, it is meant to refer to the flag bits 210 indicate whether the cache line associated with the address 220 of the memory line is valid or invalid and dirty or not dirty.

It should be noted that the tag information may include fewer or a greater number of flag bits per memory line. For example, for an instruction cache (not shown) the tag cache can include one flag bit to indicate if the data is valid/invalid and not include a flag to indicate if the data is dirty/not dirty. The valid bit state indicates whether a memory line of the cache has been loaded with valid data. Typically, on power-up, the SoC 100 (e.g., a CPU core) sets all the valid bits to invalid for all the memory lines of the cache to indicate they do not contain valid data. In certain aspects, the SoC 100 also set a valid bit to invalid at other times, for example when data is not current.

A tag cache for a data cache can use two flag bits per memory line—a valid bit and a dirty bit. Having a dirty bit set indicates that the associated memory line has been changed since it was read from main memory, meaning that the core has written data to that memory line and the new value has not propagated all the way to main memory. In this case, the data should be copied to a higher level cache or main memory before invalidating.

During hardware invalidation, flushing, or other cache maintenance operations (CMOs), in certain aspects, a complete word is accessed for each memory line of the tag cache 200, meaning both the flag bits 210 and the address 220 are accessed at the same time as there is no hardware structure to access only the flag bits. Access of a memory line powers on all the bits in the memory line. Accessing (e.g., reading or writing) the entire word uses substantial power and processing resources. It will be appreciated, that in many cases, only the flag bits 210 are of interest for reading or writing, and accessing the address 220 in addition to the flag bits 210 uses additional power and processing resources. For example, during a flush operation, if a memory line is invalid, the address 220 is typically ignored as it is either empty or incorrect, and the cache line it points to does not need to be flushed. Further, if a memory line is valid but not dirty, the address 220 does not need to be read as the cache line it points to does not need to be flushed. Further, during an invalidation operation, such as after a wake up, only the flag bits 210 may need to be written to invalid for each memory line, and the address 220 does not need to be written. Regardless, in some embodiments, the bits for address 220 are nevertheless accessed (e.g., read/written) for the memory line in addition to the flag bits 210 using power and processing resources. Thus, in certain aspects it is desirable to have a more efficient hardware design and methods of accessing memory.

Figure 3:
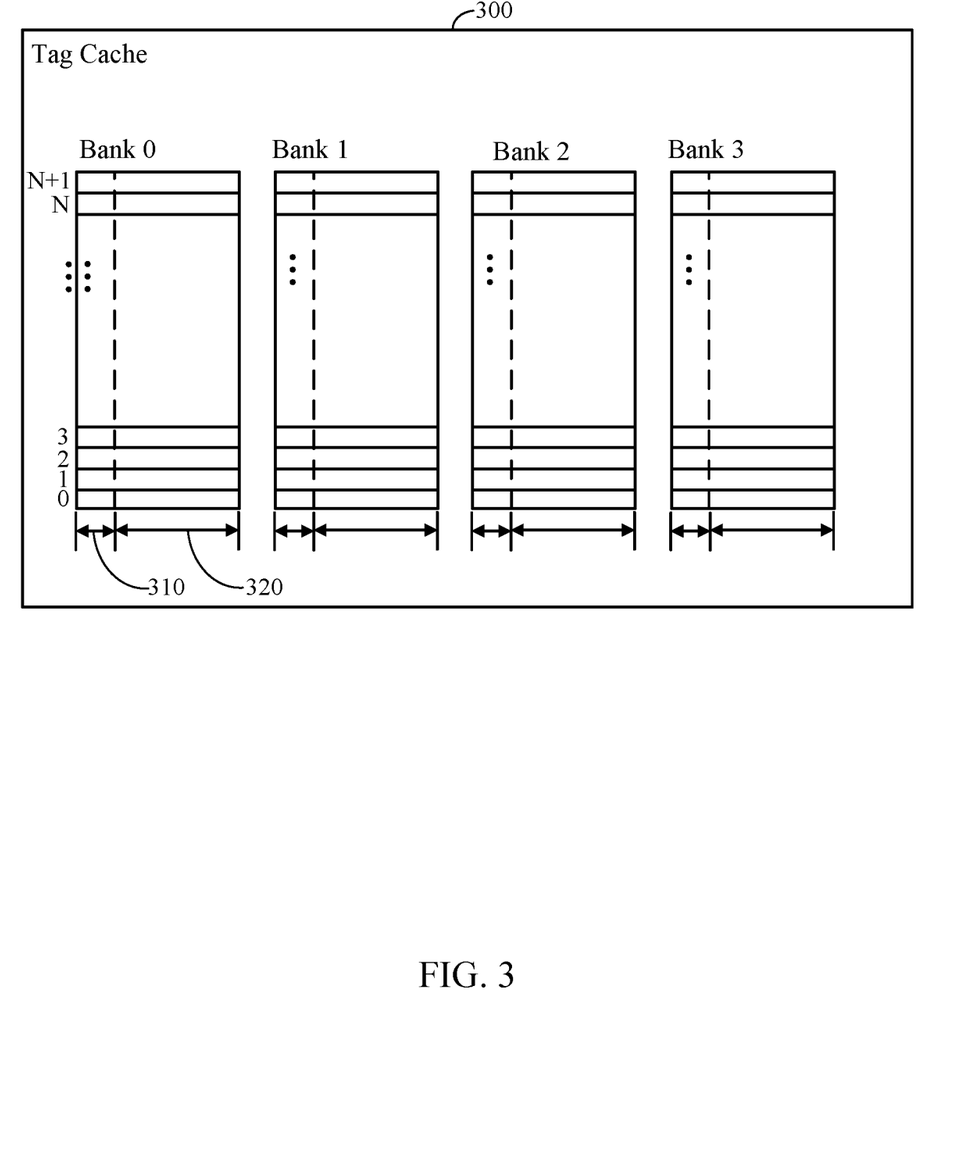
FIG. 3 is a simplified schematic diagram of a tag cache, in accordance with certain aspects of the present disclosure.

FIG. 3 is a simplified schematic diagram of a cache 300, according to certain aspects. Tag cache 300 may correspond to any of the caches shown in FIG. 1, or another cache of SoC 100. Tag cache 300 may serve as a tag cache for one or more data caches and/or instruction caches corresponding to the caches shown in FIG. 1 (e.g., caches 113, 114, 123, 124, 116, 126, 130, etc.). As shown, tag cache 300 is used as a tag cache (e.g., for a data cache) that includes 4 memory banks shown as Bank 0 through Bank 3, though the cache may include a different number of memory banks. Each memory bank in cache 300 contains a plurality of memory lines (e.g., cache lines) shown as memory line 0 through line N+1. Each memory line of each bank includes tag information including two flag bits 310 indicating valid/invalid and dirty/not dirty. It should be noted that the tag information may include fewer or a greater number of flag bits per memory line. Cache 300 also includes address 320.

In FIG. 3, flag bits 310 and address 320 are independently accessible, thus providing an asymmetric left/right enabled memory design. For example, the flag bits 310 and address 320 may have separate hardware (e.g., vias, switches, connectors, etc.) coupled to them for accessing each of the flag bits 310 and address 320 separately. Thus, SoC 100 (e.g., a core of SoC 100) can check the status of a memory line in a memory bank of cache 300 by independently accessing only the flag bits 310 without accessing address 320. In certain aspects, the design depicted in FIG. 3 provides several benefits including one or more of faster access, reduced power consumption, simplified processing, etc., since the address 320 is not unnecessarily accessed. Moreover, address 320 may be accessed without accessing flag bits 310. For example, flag bits 310 may have already been read, and the SoC 100 then determines to access address 320. The SoC 100, therefore, can access address 320 without accessing flag bits 310. By accessing only a portion of a memory line (e.g., left or right, such as corresponding to tag or address) instead of the entire memory line, there may be no dynamic power dissipated in the other portion of the memory line that is not read, thereby leading to reduced power consumption.

As explained above, the number of flag bits and address bits are only exemplary and may take other forms, such as any asymmetric memory structure where flag bits are accessed independently of address bits. For example, for an information cache, the tag cache typically only has one flag bit. In other aspects, three, four or more flag bits are used. Further, while cache 300 in FIG. 3 is shown with Bank 0 through Bank 3 all having an asymmetric left/right enabled memory design with two flag bits 310, each bank may be structured independently and used a different asymmetry, and the number of memory banks may include a single bank, or a plurality of banks greater than one.

It will be appreciated that power savings may be observed between different operations between cache 300 in FIG. 2 and cache 300 in FIG. 3. For example, cache 300 in FIG. 3 will require less power when memory lines are flushed and invalidated than cache 300 in FIG. 2 as only the flag bits 310 in FIG. 3 need to be accessed for certain memory lines, leaving address 320 unaccessed.

Figure 4:
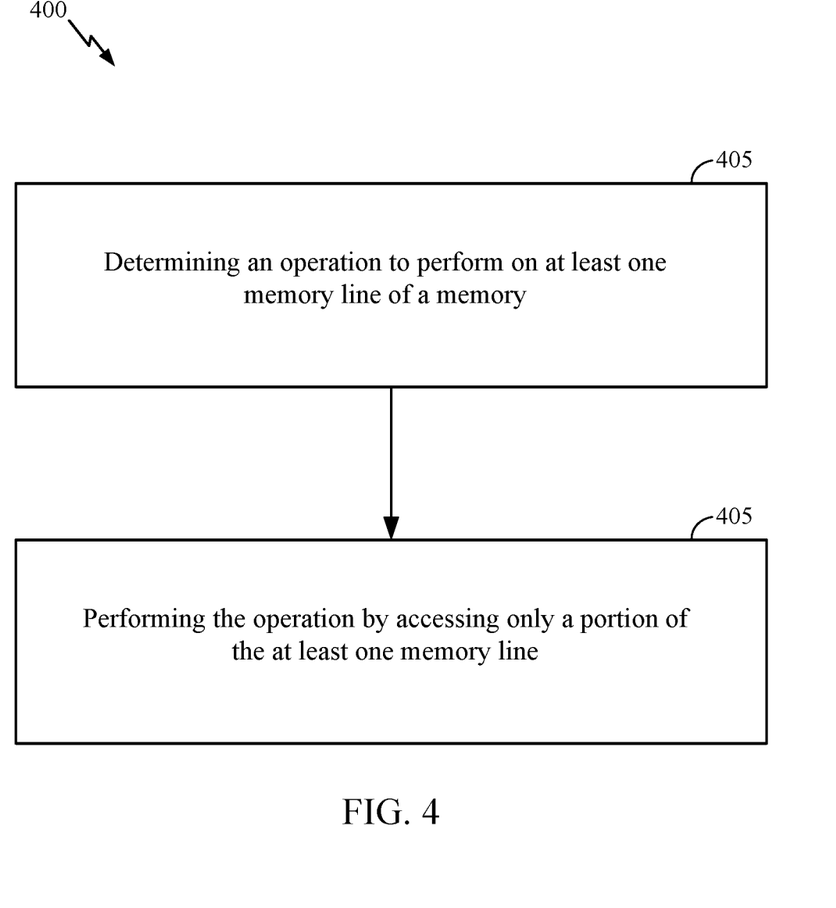
FIG. 4 is a flow chart that illustrates example operations in accordance with certain aspects of the present disclosure.

FIG. 4 is a flow chart that illustrates example operations for accessing tag information in a memory line. At block 405, a processing unit (e.g., CPU 111 in FIG. 1) determines an operation to perform on at least one memory line of a memory. At block 410, the processing unit performs the operation by accessing only a portion of the at least one memory line. In certain aspects, the portion of the at least one memory line includes one or more flag bits (e.g., flag bits 310 in memory line 0 of FIG. 3) and does not include the remaining bits (e.g., address bits 320 in memory line 0 of FIG. 3) of the at least one memory line that do not include the one or more flag bits. In certain aspects, the operations of FIG. 4 may be performed by one or more components of the SoC 100, or another suitable circuit.

In certain aspects, the operation is a flush operation and accessing the only the portion of the at least one memory line includes reading the only the portion of the at least one memory line. Further, in certain such aspects, performing the operation includes determining if the at least one memory line is valid based on a valid bit of the only the portion of the at least one memory line, when the valid bit indicates valid, flushing a cache line indicated by the remaining bits of the at least one memory line to a second memory, and when the valid bit indicates invalid, not accessing the remaining bits of the at least one memory line. Alternatively, in certain such aspects, performing the operation includes determining if the at least one memory line indicates valid based on a valid bit of the only the portion of the at least one memory line, determining if the at least one memory line indicates dirty based on a dirty bit of the only the portion of the at least one memory line, when the valid bit indicates valid and the dirty bit indicates dirty, flushing a cache line indicated by the remaining bits of the at least one memory line to a second memory, and when the valid bit indicates invalid or the dirty bit indicates not dirty, not accessing the remaining bits of the at least one memory line.

In certain aspects, the operation comprises an invalidation operation, and accessing the only the portion of the at least one memory line comprises writing a valid bit of the only the portion of the at least one memory line to invalid In some configurations, the term(s) 'communicate,' communicating; and/or 'communication' may refer to 'receive,' 'receiving,' 'reception,' and/or other related or suitable aspects without necessarily deviating from the scope of the present disclosure. In some configurations, the term(s) 'communicate,' communicating, 'communication,' may refer to 'transmit,' 'transmitting,' 'transmission'; and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc. Combinations of the above should also be included within the scope of computer-readable media.

What is claimed is:

1. A method of accessing tag information in a memory line, comprising:
   determining, by a computing core, an operation to perform on at least one memory line of a memory, the at least one memory line comprising: (i) an address portion comprising one or more address bits indicative of an address of an associated cache line, and (ii) a flag portion comprising one or more flag bits indicative of whether the associated cache line is: (i) valid or invalid, and (ii) dirty or not dirty, wherein each of the flag portion and the address portion are accessible by the computing core independent of the other via separate instances of hardware; and
   performing the operation by:
      accessing, by the computing core, only the flag portion of the at least one memory line independent of the address portion of the at least one memory line by reading only the flag portion of the at least one memory line;
      determining if the flag portion indicates valid based on a valid bit of the one or more flag bits of the at least one memory line;
      when the valid bit indicates valid, flushing a cache line indicated by the address bits of the at least one memory line to a second memory; and
      when the valid bit indicates invalid, not accessing the address bits of the at least one memory line.

2. The method of claim 1, wherein performing the operation further comprises:
   determining if the flag portion indicates dirty based on a dirty bit of the one or more flag bits of the at least one memory line, wherein:
      flushing the cache line when the valid bit indicates valid comprises flushing the cache line indicated by the address bits of the at least one memory line to the second memory when the valid bit indicates valid and the dirty bit indicates dirty; and
   when the dirty bit indicates not dirty, not accessing the address bits of the at least one memory line.

3. The method of claim 1, further comprising performing a second operation comprising an invalidation operation on at least a second memory line by accessing only the flag portion of the at least the second memory line by writing a valid bit of only the flag portion of the at least the second memory line to invalid.

4. The method of claim 1, wherein the at least one memory line comprises a plurality of memory lines.

5. The method of claim 1, wherein the separate instances of hardware include one or more of a via, a switch, or a connector separately dedicated to each of the flag portion and the address portion.

6. A computing device, comprising:
at least one computing core; and
a memory associated with the at least one computing core, wherein the memory comprises at least one memory line, wherein the at least one computing core is configured to:
determine an operation to perform on the at least one memory line, the at least one memory line comprising: (i) an address portion comprising one or more address bits indicative of an address of an associated cache line, and (ii) a flag portion comprising one or more flag bits indicative of whether the associated cache line is: (i) valid or invalid, and (ii) dirty or not dirty, wherein each of the flag portion and the address portion are accessible by the computing core independent of the other via separate instances of hardware; and
perform the operation by:
accessing only the flag portion of the at least one memory line independent of the address portion of the at least one memory line by reading only the flag portion of the at least one memory line;
determining if the flag portion indicates valid based on a valid bit of the one or more flag bits of the at least one memory line;
when the valid bit indicates valid, flushing a cache line indicated by the address bits of the at least one memory line to a second memory; and
when the valid bit indicates invalid, not accessing the address bits of the at least one memory line.

7. The computing device of claim 6, wherein performing the operation further comprises:
determining if the flag portion indicates dirty based on a dirty bit of the one or more flag bits of the at least one memory line, wherein:
flushing the cache line when the valid bit indicates valid comprises flushing the cache line indicated by the address bits of the at least one memory line to the second memory when the valid bit indicates valid and the dirty bit indicates dirty; and
when the dirty bit indicates not dirty, not accessing the address bits of the at least one memory line.

8. The computing device of claim 6, further comprising performing a second operation comprising an invalidation operation on at least a second memory line by accessing only the flag portion of the at least the second memory line by writing a valid bit of only the flag portion of the at least the second memory line to invalid.

9. The computing device of claim 6, wherein the at least one memory line comprises a plurality of memory lines.

10. A non-transitory computer readable medium that includes instructions that when executed by a computing core causes the computing core to perform a method of accessing tag information in a memory line, the method comprising:
determining an operation to perform on at least one memory line of a memory, the at least one memory line comprising: (i) an address portion comprising one or more address bits of an associated cache line, and (ii) a flag portion comprising one or more flag bits indicative of whether the associated cache line is: (i) valid or invalid, and (ii) dirty or not dirty, wherein each of the flag portion and the address portion are accessible by the computing core independent of the other via separate instances of hardware; and
performing the operation by:
accessing only the flag portion of the at least one memory line independent of the address portion of the at least one memory line by reading only the flag portion of the at least one memory line;
determining if the flag portion indicates valid based on a valid bit of the one or more flag bits of the at least one memory line;
when the valid bit indicates valid, flushing a cache line indicated by the address bits of the at least one memory line to a second memory; and
when the valid bit indicates invalid, not accessing the address bits of the at least one memory line.

11. The non-transitory computer readable medium of claim 10, wherein performing the operation further comprises:
determining if the flag portion indicates dirty based on a dirty bit of the one or more flag bits of the at least one memory line, wherein:
flushing the cache line when the valid bit indicates valid comprises flushing the cache line indicated by the address bits of the at least one memory line to the second memory when the valid bit indicates valid and the dirty bit indicates dirty; and
when the dirty bit indicates not dirty, not accessing the address bits of the at least one memory line.

12. The non-transitory computer readable medium of claim 10, further comprising performing a second operation comprising an invalidation operation on at least a second memory line by accessing only the flag portion of the at least the second memory line by comprises writing a valid bit of only the flag portion of the at least the second memory line to invalid.

13. The non-transitory computer readable medium of claim 10, wherein the at least one memory line comprises a plurality of memory lines.

* * * * *